(12) United States Patent
Luetzow

(10) Patent No.: US 6,653,830 B2
(45) Date of Patent: *Nov. 25, 2003

(54) MAGNETIC POSITION SENSOR HAVING SHAPED POLE PIECES TO PROVIDE A MAGNETIC FIELD HAVING A VARYING MAGNETIC FLUX DENSITY FIELD STRENGTH

(75) Inventor: Robert H. Luetzow, Highland Village, TX (US)

(73) Assignee: Wabash Technologies, Inc., Huntington, IN (US)

( * ) Notice: Subject to any disclaimer, the term of this patent is extended or adjusted under 35 U.S.C. 154(b) by 4 days.

This patent is subject to a terminal disclaimer.

(21) Appl. No.: 10/079,694

(22) Filed: Feb. 19, 2002

(65) Prior Publication Data

US 2003/0112006 A1 Jun. 19, 2003

Related U.S. Application Data

(60) Provisional application No. 60/340,571, filed on Dec. 14, 2001.

(51) Int. Cl.[7] .................................................. G01B 7/14
(52) U.S. Cl. ............................ 324/207.21; 324/207.24
(58) Field of Search .......................... 324/207.2, 207.21, 324/207.24, 207.25; 310/156, 48

(56) References Cited

U.S. PATENT DOCUMENTS

| | | | |
|---|---|---|---|
| 3,118,108 A | 1/1964 | Zoss et al. | |
| 3,777,273 A | 12/1973 | Baba et al. | |
| 4,395,695 A | * 7/1983 | Nakamura | ................ 338/32 H |
| 4,570,118 A | 2/1986 | Tomczak et al. | |
| 4,810,965 A | 3/1989 | Fujiwara et al. | |
| 5,508,611 A | 4/1996 | Schroeder et al. | |
| 5,670,876 A | 9/1997 | Dilger et al. | |
| 5,955,881 A | 9/1999 | White et al. | |
| 6,018,241 A | 1/2000 | White et al. | |
| 6,060,881 A | * 5/2000 | Dilger et al. | ........... 324/207.22 |
| 6,107,793 A | 8/2000 | Yokotani et al. | |
| 6,211,668 B1 | 4/2001 | Duesler et al. | |
| 6,304,078 B1 | * 10/2001 | Jarrard et al. | ............. 324/207.2 |
| 6,323,641 B1 | * 11/2001 | Allwine | .................... 324/207.2 |
| 6,400,142 B1 | 6/2002 | Schroeder | .............. 324/207.21 |
| 6,541,960 B2 | * 4/2003 | Nekado | .................. 324/207.15 |

FOREIGN PATENT DOCUMENTS

| | | | | |
|---|---|---|---|---|
| GB | 2106651 A | * | 4/1983 | ............ G01B/7/02 |
| JP | 61134601 A | * | 6/1986 | ............ G01B/7/00 |

OTHER PUBLICATIONS

U.S. patent application Ser. No. 10/079,369, Luetzow, filed Feb. 19, 2002.

* cited by examiner

*Primary Examiner*—N. Le
*Assistant Examiner*—Darrell Kinder
(74) *Attorney, Agent, or Firm*—Woodard, Emhardt, Moriarty, McNett & Henry LLP

(57) ABSTRACT

A magnetic sensor is provided which includes a pair of magnets and a pair of shaped pole pieces positioned adjacent respective ones of the magnets and spaced apart to define an air gap therebetween. The magnets and the shaped pole pieces cooperate to provide a magnetic field having a magnetic flux density that varies along a length of the air gap. A magnetic flux sensor is positioned within the magnetic field to sense varying magnitudes of magnetic flux density along the length of the air gap and to generate an output signal representative of a position of the magnetic flux sensor relative to the magnetic field. In one embodiment, the air gap defines a varying width to provide varying magnitudes of magnetic flux density along the length. In another embodiment, the shaped pole pieces include portions of varying thickness to provide varying magnitudes of magnetic flux density along the length.

40 Claims, 7 Drawing Sheets

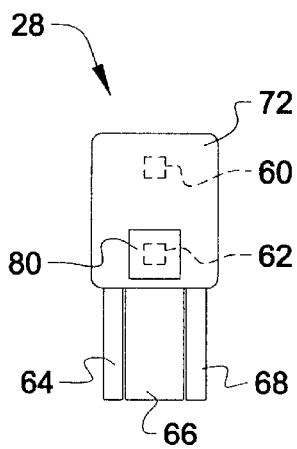 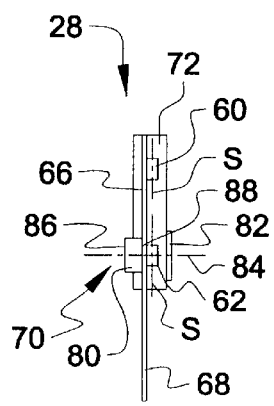 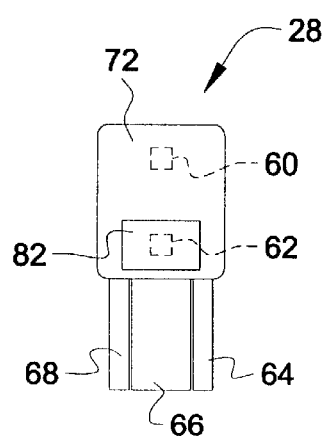
Fig. 4　　　Fig. 3　　　Fig. 5
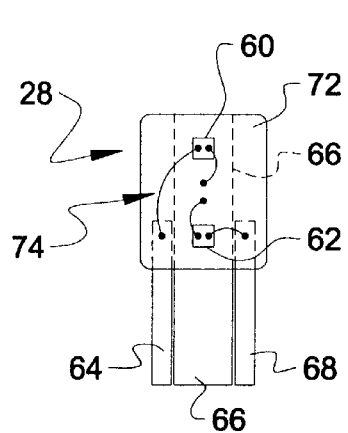 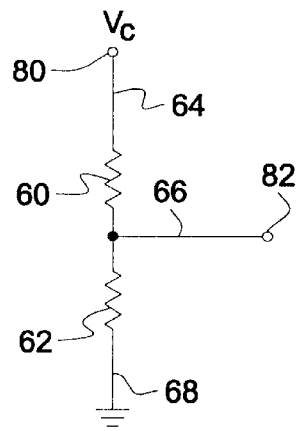
Fig. 6　　　Fig. 7

US 6,653,830 B2

MAGNETIC POSITION SENSOR HAVING SHAPED POLE PIECES TO PROVIDE A MAGNETIC FIELD HAVING A VARYING MAGNETIC FLUX DENSITY FIELD STRENGTH

CROSS REFERENCE TO RELATED APPLICATIONS

The present application claims the benefit of Provisional Application Ser. No. 60/340,571 filed on Dec. 14, 2001, the contents of which are hereby incorporated by reference in their entirety.

FIELD OF THE INVENTION

The present invention generally relates to the field of magnetic sensors for sensing the position of a structure over a predetermined range of movement, and more specifically relates to a non-contacting magnetic position sensor having shaped poles pieces to provide a magnetic field having a varying magnetic flux density field strength.

BACKGROUND OF THE INVENTION

Magnetic position sensors are devices that generate a change in electronic signal output that is indicative of the sensed movement of a mechanical component, such as, for example, a control shaft or rotor in the case of rotational position sensors or a carrier mechanism or linkage in the case of linear position sensors. Preferably, the change in electronic signal is achieved without physical contact between the mechanical component and the magnetic sensing element. In non-contacting magnetic position sensors, one or more magnets are used to provide a magnetic field having a magnetic field strength or flux density that varies as a function of linear or rotational position.

Variation in the magnitude of the magnetic field strength or flux density is detected by an appropriate sensing device, such as, for example, a Hall-effect element or magneto-resistive element. The magnitude of the magnetic flux density is translated through the sensing device and converted to a voltage or current output signal that is uniquely representative of a specific position of a mechanical component relative to the magnetic field. Preferably, the magnetic position sensor provides a substantially linear relationship between electronic signal output and the position of the mechanical component. In addition to providing a linear relationship, minimizing hysteresis is also a desirable feature in most magnetic sensor applications. While annealing the magnets can reduce magnetic hysteresis, the annealing process can never eliminate magnetic hysteresis entirely.

To generate a magnetic field having a substantially linear profile, those skilled in the art sometimes resort to complicated magnet shapes. For example, U.S. Pat. No. 5,995,881 to White et al. discloses a magnetic circuit that utilizes tapered magnets to provide a magnet field having a varying magnetic field strength. However, magnetic circuits that rely on geometric shaping of the magnets to provide a varying magnetic field commonly suffer from performance and/or manufacturing limitations. For example, providing a magnetic circuit having a linearly varying magnetic field strength is difficult to achieve via magnet shaping due to non-uniformity in material composition and/or complexities in the geometric configuration of the magnet. Additionally, shaped magnets often include magnetic flux "hot spots" that effect localized magnetic field strength. Moreover, non-standard magnetic materials are typically used to manufacture magnets having irregular shapes and configurations. Moldable plastic materials are sometimes used to form certain types of irregular shaped magnets. It is often difficult, however, to control the density of the magnetic material. Additionally, use of magnets formed of a moldable plastic material is usually not possible in extreme temperature environments. Moreover, complicated magnet shapes often lead to increased manufacturing costs and limitations on package size. The use of non-standard magnet compositions also tends to increase manufacturing costs.

Magnetic position sensors may be used in a wide variety of applications. For example, magnetic position sensors are used extensively in the automotive industry to monitor the status and position of various automotive components. Notably, position sensors that are used in automotive-related applications typically experience virtually constant movement and/or mechanical vibration while the automobile is in operation. To that end, such sensors must be constructed of mechanical and electrical components that are assembled in such a manner as to minimize the effects of misalignment and/or mispositioning to allow the sensor to operate in a sufficiently accurate and precise manner over the sensor's projected lifespan. Moreover, automotive position sensors are typically subjected to relatively harsh thermal environments, and therefore must be designed to withstand extreme temperatures and temperature gradients. Typically, automotive sensors must be able to function properly within a temperature range of at least −40 degrees Celsius to 200 degrees Celsius. Additionally, automotive position sensors must usually satisfy relatively high performance criteria, particularly with regard to sensor accuracy and repeatability.

Thus, there is a general need in the industry to provide an improved magnetic position sensor. The present invention satisfies this need and provides other benefits and advantages in a novel and unobvious manner.

SUMMARY OF THE INVENTION

The present invention is directed to a magnetic position sensor having shaped pole pieces to provide a magnetic field having a varying magnetic flux density field strength. While the actual nature of the invention covered herein can only be determined with reference to the claims appended hereto, certain forms of the invention that are characteristic of the preferred embodiments disclosed herein are described briefly as follows. However, it should be understood that other embodiments are also contemplated as falling within the scope of the present invention.

In one form of the present invention, a magnetic sensor is provided which includes a pair of magnets and a pair of shaped pole pieces positioned adjacent respective ones of the magnets and spaced apart to define an air gap having a varying width along a length thereof. The magnets and the shaped pole pieces cooperate to provide a magnetic field having a magnetic flux density that varies along the length of the air gap, with a magnetic flux sensor positioned within the magnetic field to sense varying magnitudes of magnetic flux density along the length of the air gap and to generate an output signal representative of a position of the magnetic flux sensor relative to the magnetic field.

In another form of the present invention, a magnetic sensor is provided which includes a pair of magnets and a pair of shaped pole pieces positioned adjacent respective ones of the magnets and spaced apart to define an air gap, with at least one of the shaped pole pieces including a portion of varying thickness. The magnets and the shaped pole pieces cooperate to provide a magnetic field having a magnetic flux density that varies along a length of the air gap adjacent the portion of varying thickness, with a magnetic flux sensor positioned within the magnetic field to sense varying magnitudes of magnetic flux density along the length of the air gap adjacent the portion of varying thickness and to generate an output signal representative of a position of the magnetic flux sensor relative to the magnetic field.

In yet another form of the present invention, a magnetic sensor is provided which includes at least two magnets and at least two shaped pole pieces positioned adjacent respective ones of the magnets and being spaced apart to define a first air gap and a second air gap, with the magnets and the shaped pole pieces cooperating to provide a first magnetic field having a magnetic flux density that varies along a length of the first air gap, and a second magnetic field having a magnetic flux density that varies along a length of the second air gap. A magnetic flux sensor is provided which includes a first magnetic flux sensor element positioned within the first magnetic field to sense varying magnitudes of magnetic flux density along the length of the first air gap, and a second magnetic flux sensor element positioned within the second magnetic field to sense varying magnitudes of magnetic flux density along the length of the second air gap, and wherein the first and second magnetic flux sensor elements cooperate to generate an output signal representative of a position of the magnetic flux sensor relative to the first and second magnetic fields.

In still another form of the present invention, a magnetic sensor is provided which a pair of magnets and pair of shaped pole pieces positioned adjacent respective ones of the magnets and spaced apart to define an air gap. The magnets and the shaped pole pieces cooperate to provide a magnetic field having a magnetic flux density that varies along a length of the air gap. A first magnetoresistive element is positioned within the magnetic field to sense a varying magnitude of the magnetic flux density along a length of the air gap, and a second magnetoresistive element is positioned within an auxiliary magnetic field having a substantially uniform magnetic flux density. The first and second magnetoresistive elements cooperate to generate an output signal representative of a position of the first magnetoresistive element relative to the magnetic field.

It is one object of the present invention to provide an improved magnetic sensor having shaped poles pieces to provide a magnetic field having a varying magnetic flux density field strength.

Further objects, features, advantages, benefits, and aspects of the present invention will become apparent from the drawings and description contained herein.

BRIEF DESCRIPTION OF THE DRAWINGS

FIG. 3 is an end view of a magnetoresistor sensor assembly according to one embodiment of the present invention.

FIG. 4 is a left side view of the magnetoresistor sensor assembly illustrated in FIG. 3.

FIG. 5 is a right side view of the magnetoresistor sensor assembly illustrated in FIG. 3.

FIG. 6 is a diagrammatic view of the electronic circuit associated with the magnetoresistor sensor assembly illustrated in FIG. 3.

FIG. 7 is the electronic circuit associated with the magnetoresistor sensor assembly illustrated in FIG. 3.

DESCRIPTION OF THE PREFERRED EMBODIMENTS

Figure 1:
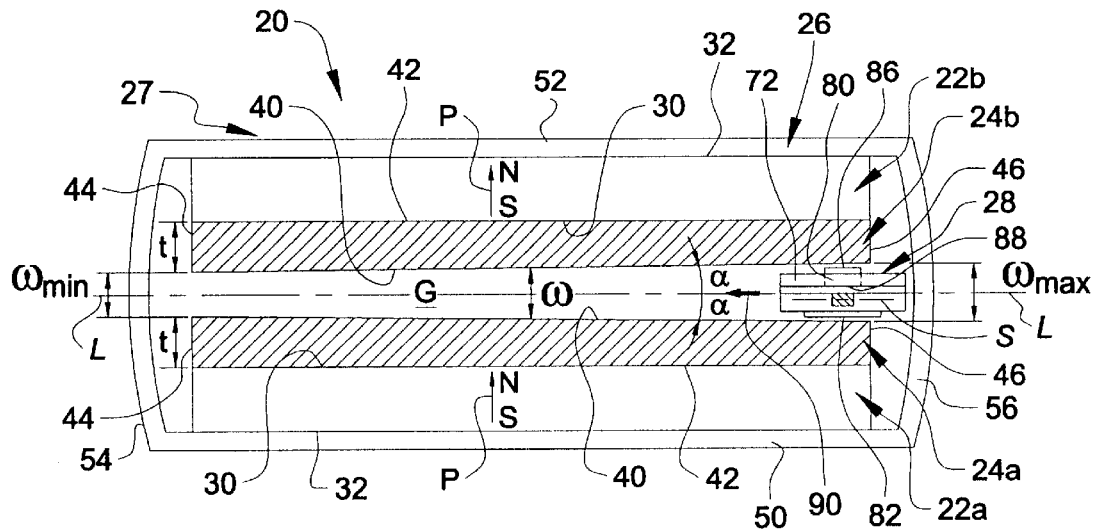
FIG. 1 is a top plan view of a magnetic position sensor according to one form of the present invention.

For the purposes of promoting an understanding of the principles of the present invention, reference will now be made to the preferred embodiments illustrated in the drawings and specific language will be used to describe the same. It will nevertheless be understood that no limitation on the scope of the present invention is intended, and any alterations or modifications in the disclosed embodiments and further applications of the principles of the present invention are contemplated as would normally occur to one skilled in the art to which the present invention relates.

Figure 2:
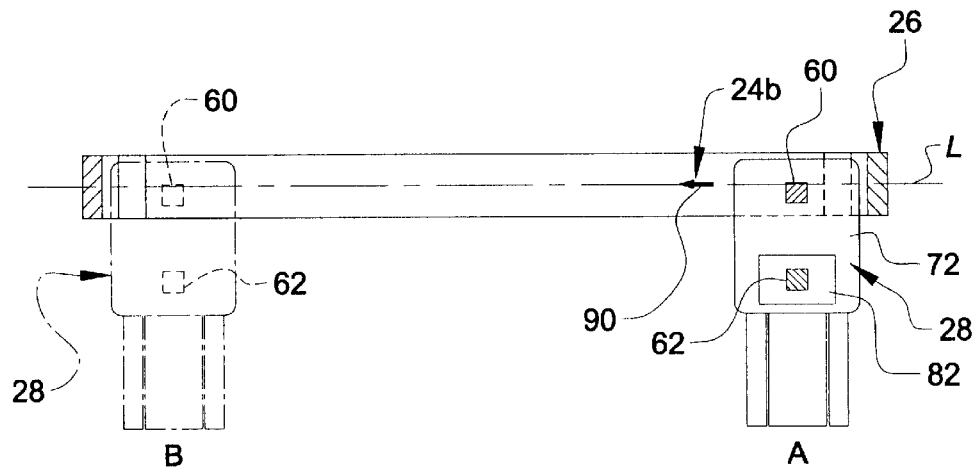
FIG. 2 is a sectional view of the magnetic position sensor illustrated in FIG. 1.

Referring to FIGS. 1 and 2, shown therein is a magnetic position sensor 20 according to one form of the present invention. The magnetic sensor 20 includes a magnetic circuit that is generally comprised of a pair of magnets 22a, 22b, a pair of shaped pole pieces 24a, 24b, and a magnetically permeable bracket or loop pole piece 26. The magnets 22a, 22b, the shaped pole pieces 24a, 24b, and the loop pole piece 26 cooperate with one another to provide a closed magnetic circuit 27 that generates a magnetic field having a magnetic flux density field strength that varies along an air gap G extending generally along a longitudinal axis L. The magnetic sensor 20 also includes a sensing device 28 that is operable to sense varying magnitudes of the magnetic flux density field generated by the magnetic circuit 27 and to generate an output signal representative of the sensed magnitude of magnetic flux density.

Although the magnetic position sensor 20 illustrated and described herein is configured as a linear position sensor (e.g., a sensor having a sensing path extending along a substantially linear axis), it should be understood that the magnetic sensor 20 could alternatively be configured for use in other applications as well, such as, for example, a rotary position sensor (e.g., a sensor having a sensing path extending along an arcuate or circular axis). Additionally, although not specifically illustrated and described herein, it should be understood that the magnetic position sensor 20 is preferably enclosed within a sensor housing to protect the magnetic circuit 27 and the sensing device 28 from the surrounding environment and to provide a means for mounting the position sensor 20 to a suitable substrate. The details regarding the inclusion of a sensor housing would be apparent to one skilled in the art, and therefore need not be specifically discussed herein.

In a preferred embodiment of the present invention, the magnets 22a, 22b are rare earth magnets having a substantially rectangular configuration. This particular type and shape of magnet is relatively common, thereby increasing sourcing opportunities and reducing the overall cost of the magnetic sensor 20. In a specific embodiment of the invention, the rare earth magnets 22a, 22b are injection molded and are substantially void of any magnetic flux density hot spots. However, it should be understood that other types of magnets having different material compositions and/or methods of manufacture are also contemplated as would occur to one of ordinary skill in the art. It should also be understood that other shapes and/or configuration of magnets are also contemplated as would occur to one of ordinary skill in the art. For example, the magnets 22a, 22b may take on a circular or arcuate configuration in applications involving rotary sensor designs. Additionally, it should be understood that the magnets 22a, 22b may take on nonrectangular or irregular shapes in certain applications involving linear or rotary sensor designs. Additionally, although each of the magnets 22a, 22b is illustrated as being formed as a single piece, it should be understood that either or both of the magnets 22a, 22b could alternatively be comprised of multiple axial sections positioned adjacent one another in an end-to-end manner to form a substantially continuous magnet strip.

Each of the magnets 22a, 22b preferably has a substantially identical shape and configuration. Therefore, like features of the magnets 22a, 22b will be referred to using the same reference numerals. The magnets 22a, 22b each include an inwardly facing axial surface 30 and an outwardly facing axial surface 32, with the inner surface 30 of magnet 22a arranged generally opposite and spaced from the inner surface 30 of magnet 22b to define an axial spacing therebetween. In a preferred embodiment of the present invention, the inner surfaces 30 of magnets 22a, 22b are of opposite polarity to generate a magnetic field flowing between magnets 22a, 22b and across the air gap G. In the illustrated embodiment, the inner and outer surfaces 30, 32 of magnet 22a are north and south pole surfaces, respectively, and the inner and outer surfaces 30, 32 of magnet 22b are south and north pole surfaces, respectively. As a result, the magnets 22a, 22b are polarized in the same polarization direction P. However, it should be understood that other magnetic polarization arrangements are also contemplated as falling within the scope of the present invention. For example, the polarization direction P of one or both of the magnets 22a, 22b may be reversed to provide alternative magnetic circuit set-ups.

In a preferred embodiment of the present invention, the shaped pole pieces 24a, 24b are formed of a magnetically permeable material, such as, for example, soft magnetic steel or cold rolled steel (hereafter "CRS"). However, it should be understood that other magnetically permeable materials are also contemplated as falling within the scope of the present invention. For example, in an alternative embodiment, the pole pieces 24a, 24b may be at least partially formed of a non-magnetic material having a magnetic reluctance less than the magnetic reluctance of CRS. In a specific embodiment, the pole pieces 24a, 24b may be at least partially formed of a plastic or polymer material, such as, for example, a nylon material. In another specific embodiment, the pole pieces 24a, 24b may be formed of a composite material comprised of a non-magnetic material and a magnetizable filler material, such as, for example Nylon 6/6. Further details regarding the use of such alternative materials to form the pole pieces 24a, 24b are found in U.S. Provisional Patent Application No. 60/340,571 to Luetzow, the contents of which are hereby incorporated by reference in their entirety.

In a preferred embodiment of the present invention, the shaped pole pieces 24a, 24b have a substantially identical shape and configuration. Therefore, like features of the shaped pole pieces 24a, 24b will be referred to using the same reference numerals. Each of the shaped pole pieces 24a, 24b preferably defines an irregular or non-rectangular shape having a varying axial thickness t. In one embodiment of the present invention, each of the shaped pole pieces 24a, 24b has a wedge or ramp shape. Specifically, each of the pole pieces 24a, 24b preferably includes an inwardly facing tapered surface 40 and an outwardly facing axial surface 42, with each of the surfaces 40, 42 extending between a pair of opposite end surfaces 44, 46. The tapered surfaces 40 are preferably sloped at an acute angle $\alpha$ relative to the longitudinal axis L. In a specific embodiment, the angle $\alpha$ falls within a range of about 1 degree to about 20 degrees, and in a more specific embodiment angle $\alpha$ is approximately 5 degrees. However, it should be understood that other acute angles $\alpha$ are also contemplated as falling within the scope of the present invention, including angles $\alpha$ less than 1 degree or greater than 20 degrees.

Although the tapered surfaces 40 are illustrated as being substantially planar, it should be understood that non-planar configurations are also contemplated, such as, for example, curvilinear or arcuate configurations defining various degrees of curvature and/or arc length. It should also be understood that the tapered surfaces 40 may alternatively be comprised of both planar and curved sections. Additionally, although the tapered surfaces 40 are illustrated as defining a single tapered section defining a substantially uniform taper angle $\alpha$, the tapered surfaces 40 may alternatively define multiple tapered sections arranged at various taper angles. It should likewise be understood that the tapered surfaces 40 may alternatively define multiple tapered sections defining a number of curved sections defining one or more compound curves.

As illustrated in FIG. 1, the shaped pole pieces 24a, 24b are preferably configured and arranged in a substantially symmetrical relationship relative to the longitudinal axis L. The outer axial surfaces 42 of pole pieces 24a, 24b are preferably positioned adjacent the inner axial surfaces 30 of magnets 22a, 22b, respectively. The axial surfaces 42 of pole pieces 24a, 24b are preferably adjoined to the axial surfaces 30 of magnets 22a, 22b by any method know to those of ordinary skill in the art. Such adjoinment substantially prevents relative movement between the components of the magnetic circuit, which in turn eliminates or at least minimizes sensor error and/or magnetic hysteresis. For purposes of the present invention, the term "adjoined" is broadly defined as a unitary fabrication, a permanent affixation, a detachable coupling, a continuous engagement or a contiguous disposal of a first structure relative to a second structure. In one embodiment, adjoinment is accomplished through the use of a bonding agent, such as, for example, an adhesive or a plastic bond. However, other methods of adjoinment are also contemplated, such as, for example, welding, fastening or any other method that would occur to one of ordinary skill in the art.

Figure 8:
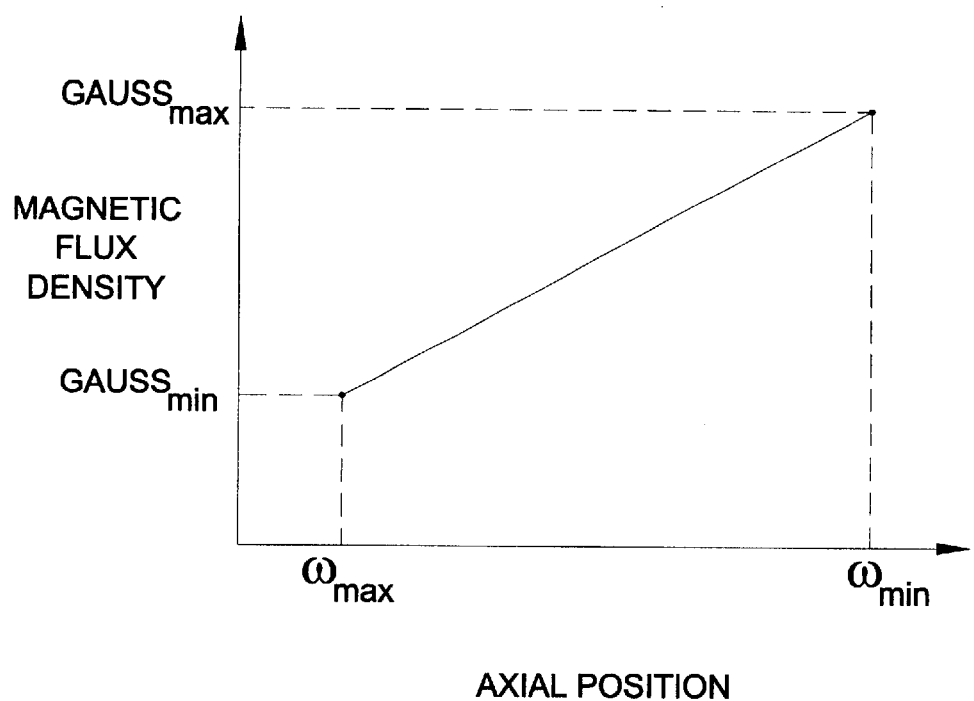
FIG. 8 is a graph depicting magnetic flux density along a sensing path of the magnetic position sensor illustrated in FIG. 1 as a function of axial position along the sensing path.

The tapered surfaces 40 of pole pieces 24a, 24b are preferably arranged generally opposite one another to define an air gap G therebetween having a width w that preferably varies in a substantially uniform manner along the longitudinal axis L, with a distance between the tapered surfaces 40 adjacent ends 44 defining a minimum gap width $w_{MIN}$, and with a distance between the tapered surfaces 40 adjacent ends 46 defining a maximum gap width $w_{MAX}$. Although the longitudinal axis L and/or the air gap G are illustrated as extending along a substantially linear path, it should be understood that axis L and/or air gap G may alternatively extend along a non-linear path, such as, for example, an arcuate or circular path. A circular or arcuate path may be particularly applicable to rotary type sensor designs, the application of which would be apparent to one of ordinary skill in the art. It should also be understood that although the shaped pole pieces 24a, 24b have been illustrated and described as being arranged in a substantially symmetrical relationship relative to the longitudinal axis L, other non-symmetrical configurations are also contemplated. For example, the shaped pole pieces 24a, 24b may be configured to have different geometric configurations and/or the tapered surfaces 40 may be configured to have different geometric profiles. Additionally, although the shaped pole pieces 24a, 24b have been illustrated and described as having a specific geometric configuration with the tapered surfaces 40 having a particular geometric profile, it should be understood that other geometric configurations and profiles are also contemplated depending on the specific application of sensor 20. The magnets 22a, 22b and the shaped pole pieces 24a, 24b cooperate to generate a magnetic field within the air gap G having a magnetic flux density field strength that varies along the longitudinal axis L. Such variation in the magnitude of the magnetic flux density field strength is primarily dictated by the varying thickness t of the shaped pole pieces 24a, 24b and the varying width w of the air gap G. Preferably, the magnetic flux density field strength varies in a substantially linear manner along the longitudinal axis L. For example, as shown in FIG. 8, the magnetic flux density field strength within air gap G is at a minimum at a location adjacent ends 46 of pole pieces 24a, 24b, which corresponds to the maximum width $w_{MAX}$ of air gap G. Likewise, the magnetic flux density within air gap G is at a maximum at a location adjacent ends 44 of pole pieces 24a, 24b, which corresponds to the minimum width $w_{MIN}$ of air gap G. In one embodiment of the present invention, the magnetic flux density at the maximum width $w_{MAX}$ is about 1050 Gauss, and the magnetic flux density at the minimum width $w_{MIN}$ is about 1450 Gauss, with the magnetic flux density at a point midway between the minimum width $w_{MIN}$ and the maximum width $w_{MAX}$ being about 1250 Gauss. It should be understood, however, that the specific magnitudes of magnetic flux density are for illustrative purposes only, and that the primary magnetic circuit 27 could be configured to produce other magnitudes of magnetic flux density field strength depending upon the particular operational requirements of the magnetic position sensor 20.

As should now be appreciated, the strength of the magnetic flux density field strength along the air gap G is inversely proportional to the width w of the air gap G. In other words, as the width w of the air gap G is decreased, the magnetic flux density increases. Likewise, as the width w of the air gap G is increased, the magnetic flux density decreases. As discussed above, the magnetic flux density field strength preferably varies in a substantially linear manner along a length of the air gap G. In order to provide such a linear relationship, the precise configuration of the pole pieces 24a, 24b may be changed. For example, relatively minor modifications can be made to the shape of the pole pieces 24a, 24b, such as the particular geometric configuration of the tapered surface 40, to further linearize the magnetic flux density field strength along the air gap G. Such modifications may be made, for example, to compensate for magnetic hot spots and/or non-linear magnetic field strength associated with the magnets 22a, 22b.

In a preferred embodiment of the present invention, the magnets 22a, 22b and the shaped pole pieces 24a, 24b are surrounded or bound by a loop pole piece 26. Preferably, the loop pole piece 26 is formed of a magnetically permeable material, such as, for example, soft magnetic steel or CRS. However, it should be understood that other suitable magnetically permeable materials are also contemplated. In the illustrated embodiment of the invention, the loop pole piece 26 has an oval-rectangular configuration, including a pair of opposite axial walls 50, 52 and a pair of opposite arcuate walls 54, 56 interconnecting the axial walls 50, 52. The outer axial surfaces 32 of magnets 22a, 22b are preferably positioned adjacent the axial walls 50, 52 of loop pole piece 26, respectively. Additionally, the outer axial surfaces 32 of magnets 22a, 22b are preferably adjoined to the axial walls 50, 52 of loop pole piece 26 to substantially prevent relative movement between the components of the magnetic circuit to eliminate or at least minimize sensor error and/or magnetic hysteresis.

The loop pole piece 26 serves to enhance/intensify the magnetic field levels generated across the air gap G by providing a return path for the magnetic flux generated by the magnets 22a, 22b. Additionally, the loop pole piece 26 serves to shield the magnetic circuit from any magnetic fields existing outside of the sensor 20 to prevent or at least minimize magnetic hysteresis and/or magnetic or electrical interferences. Although the loop pole piece 26 has been illustrated and described as having an oval-rectangular configuration, it should be understood that other shapes and configurations are also contemplated. For example, the loop pole piece 26 could alternatively define an annular ring, such as might be particularly applicable to a rotary type position sensor. It should also be understood that the inclusion of a loop pole piece 26 is not necessarily required for proper operation of the sensor 20, and that alternative embodiments of the sensor 20 do not include a loop pole piece 26.

The magnetic flux sensor 28 is positioned within the air gap G and is operable to sense varying magnitudes of magnetic flux density field strength along the longitudinal axis L and to generate an output signal indicative of the sensed magnitude of magnetic flux density. For purposes of the present invention, a "magnetic flux sensor" is broadly defined as any device that is capable of sensing magnetic flux density and generating at least one output signal that is representative of the sensed magnitude of the magnetic flux density. In a preferred embodiment of the present invention, the magnetic flux sensor 28 is a magnetoresistor-type sensor assembly or nugget (hereafter "MR sensor"). Use of an MR sensor is particularly advantageous in applications involving harsh operating environments, such as, for example, where temperatures exceed 160 degrees Celsius. However, it should be understood that other types of magnetic flux sensors are also contemplated for use with the present invention, such as, for example, a Hall-effect sensor, a magnetic diode sensor, or any other magnetic field-sensitive sensor that would occur to one of ordinary skill in the art.

An MR sensor or nugget assembly is generally comprised of a thin body of semi-conductive material including one or more MR elements mounted thereto and with electrical contacts extending therefrom. Although the body of the MR sensor assembly 28 is illustrated as having a generally rectangular configuration, it should be understood that other sensor shapes and configurations are also contemplated. As known to those of skill in the art, the resistance of an MR element varies in accordance with the strength of the magnetic field applied thereto. For most applications, the MR elements are disposed within a magnetic field to sense and measure variations in magnetic field strength or flux density, with the sensing plane of the MR element being arranged substantially perpendicular to the magnetic flux generated by the magnetic circuit. Further information regarding the configuration and operation of MR sensor assemblies and MR elements suitable for use in association with the present invention may be found in the following U.S. patents, the contents of which are hereby incorporated by reference in their entirety: U.S. Pat. No. 4,926,154 to Heremans et al., U.S. Pat. No. 4,978,938 to Partin et al., U.S. Pat. No. 5,038,131 to Olk et al., U.S. Pat. No. 5,508,611 to Schroeder et al., and U.S. Pat. No. 5,883,564 to Parity.

Referring to FIGS. 3–5, shown therein is an MR sensor or nugget assembly 28 according to one embodiment of the present invention. The MR sensor 28 is generally comprised of a pair of MR elements 60, 62 and a number of conductors 64, 66, 68 for electrically interconnecting the MR elements 60, 62. In one embodiment of the invention, the MR elements 60, 62 have a resistive capacity of between about 500 ohms and about 1000 ohms. Additionally, the MR sensor assembly 28 is preferably configured to operate in extreme thermal environments, including thermal environments exhibiting temperatures up to 220 degrees Celsius. However, other types of MR elements having other resistive capacities and thermal capabilities are also contemplated as falling within the scope of the present invention. In a preferred embodiment of the present invention, the conductors 64, 66, 68 are copper lead frame terminals; however, as would be apparent to one of ordinary skill in the art, other types of conductors may alternatively be used to electrically interconnect the MR elements 60, 62. The MR sensor assembly 28 preferably includes an auxiliary magnetic circuit 70 associated with the MR element 62. The features, operation and purpose of the auxiliary magnetic circuit 70 will be described below. The components of the MR sensor assembly 28 are preferably encased in a plastic molding material 72 so as to define a substantially rectangular shaped body. However, it should also be understood that the MR element 62 and the auxiliary magnetic circuit 70 could be positioned at a location remote from the primary magnetic circuit 27, and need not necessarily be formed integral with the MR element 60 to form an integrated MR sensor assembly 28.

Referring to FIGS. 6 and 7, shown therein is an electronic circuit associated with the MR sensor assembly 28 according to one embodiment of the present invention. The conductor 64 is operatively connected to a DC voltage source (not shown) at input node 80 for supplying a substantially constant voltage Vc to the MR sensor 28. In one embodiment of the invention, the power source is selected to provide a voltage Vc of about +5 Volts; however, other suitable power sources are also contemplated as falling within the scope of the present invention. The conductor 68 is operatively connected to a ground. The conductor 66 is operatively connected to a signal conditioning output device (not shown) at output node 82. Suitable signal conditioning output devices include, for example, a signal amplifier, such as a programmable operational signal amplifier. One type of signal conditioning output device and related circuitry suitable for use with the present invention is disclosed in U.S. Provisional Patent Application No. 60/308,926 to Luetzow and U.S. patent application Ser. No. 09/413,647 to Luetzow, the contents of each application being incorporated herein by reference in their entirety.

As shown in FIG. 6, the MR elements 60, 62 are electrically connected to the conductors 64, 66, 68 by a number of wire bonds 74. Specifically, the voltage source conductor 64 is electrically connected to the input terminal of the MR element 60, with the output terminal of the MR element 60 electrically connected to the signal output conductor 66. The input terminal of the MR element 62 is electrically connected to the signal output conductor 66, with the output terminal of the MR element 62 electrically connected to the ground conductor 68. As a result, the MR elements 60, 62 are effectively connected in series, with an electric potential being applied across the serially connected MR elements 60, 62 to develop an output potential at a junction between the MR elements 60, 62 that is in turn fed through the signal output conductor 66 to the output node 82.

Referring once again to FIGS. 3–5, the auxiliary magnetic circuit 70 is generally comprised of a magnet 80 and a plate pole piece 82. The magnet 80 and the plate pole piece 82 are preferably positioned on opposite sides of the MR element 62 and are preferably generally aligned along an axis 84 extending perpendicularly through the sensing planes of the MR element 62. The auxiliary magnetic circuit 70 is preferably positioned outside of the magnetic field generated by the primary magnetic circuit 27 and is configured to produce a magnetic field that provides a substantially constant level of magnetic flux density passing through the MR element 62. In one embodiment of the present invention, the auxiliary magnetic circuit 70 is configured to produce a magnetic field having a relatively constant magnetic flux density field strength of about 1250 Gauss directed through the MR element 62. However, it should be understood that the auxiliary magnetic circuit 70 could be configured to produce other magnitudes of magnetic flux density field strength depending upon the particular requirements of the magnetic position sensor 20.

The magnet 80 is preferably a rare earth magnet having a substantially rectangular configuration. However, it should be understood that other types and configurations of magnets are also contemplated as would occur to one of ordinary skill in the art. The plate pole piece 82 is rectangular shaped and is preferably formed of a magnetically permeable material, such as, for example, soft magnetic steel or CRS. However, it should be understood that other suitable shapes and materials are also contemplated as would occur to one of ordinary skill in the art. The plate pole piece 82 serves to enhance/intensify the magnetic field levels passing through the MR element 62 by providing a return path for the magnetic flux generated by the magnet 80. Additionally, the plate pole piece 82 serves to shield the auxiliary magnetic circuit 70 from other magnetic fields, such as the magnetic field generated by the primary magnetic circuit 27, to prevent or at least minimize magnetic hysteresis and/or magnetic interference. It should be understood, however, that the inclusion of a plate pole piece 82 is not necessarily required for the proper functioning of the auxiliary magnetic circuit 70 and/or the proper operation of the sensor 20, and that alternative embodiments of the present invention do not necessarily include a plate pole piece 82.

The magnet 80 includes an outer surface 86 facing away from the MR element 62 and an inner surface 88 facing toward and arranged generally opposite the MR element 62. In a preferred embodiment of the present invention, the magnet 80 is polarized in a direction opposite that of the adjacent magnet 22a, 22b when the MR sensor 28 is positioned within the air gap G. For example, referring once again to FIG. 1, the inner surface 30 of magnet 22b is a south pole surface, and therefore the outer surface 86 of magnet 80 is preferably a south pole surface to provide the magnet 80 with a polarity opposite that of magnet 22b. As a result, the opposing magnetic fields generated by the magnets 80, 22b will cause the magnets 80, 22b to repel one another. Such an arrangement tends to reduce the likelihood of one of the magnets potentially interfering with the function of the other, and also tends to reduce bearing wear in the carrier mechanism (not shown) used to permit relative displacement between the primary magnetic circuit 27 and the sensor assembly 28. It should be understood, however, that the sensor 20 would still function even if the magnet 80 and the adjacent magnet 22a, 22b were polarized in the same direction.

Having discussed the features associated with the various components of the magnetic position sensor 20, reference will be made once again to FIGS. 1 and 2 to describe the operation of sensor 20 according to one embodiment of the present invention. As discussed above, the magnetic field generated by the primary magnetic circuit 27 (e.g., magnets 22a, 22b, shaped pole pieces 24a, 24b, and loop pole piece 26) produces a magnetic flux density field strength that preferably varies in a substantially linear manner along the air gap G. The MR element 60 of the MR sensor assembly 28 is disposed within the air gap G and is operable to sense varying magnitudes of the magnetic flux density along the longitudinal axis L. The MR element 60 includes a magnetic flux sensing plane S that is preferably arranged and oriented such that flux lines extending across the air gap G will pass perpendicularly through the sensing plane S. However, it should be understood that other orientations of the sensing plane S are also contemplated as falling within the scope of the present invention. As should be appreciated, as the MR sensor 28 is relatively displaced through the air gap G and along the longitudinal axis L, varying magnitudes of magnetic flux density will pass through the MR element 60. Variation in the sensed magnitude of magnetic flux density will correspondingly change the resistive value associated with the MR element 60, which in turn effects a change in the voltage output signal representative of the particular axial position of the MR element 60 relative to the magnetic field provided by the primary magnetic circuit 27.

In one embodiment of the present invention, relative displacement between the MR element 60 and the magnetic field generated by the primary magnetic circuit 27 is accomplished by maintaining the MR sensor assembly 28 in a stationary position while displacing the primary magnetic circuit 27 along the longitudinal axis L. Such an arrangement tends to simplify electrical interconnection with the MR sensor assembly 28. However, it should be understood that in another embodiment of the present invention, relative displacement between the MR element 60 and the magnetic field may be accomplished by maintaining the primary magnetic circuit 27 in a stationary position while displacing the MR sensor 28 along the longitudinal axis L. This arrangement has the advantage of significantly reducing the overall package size of the position sensor 20. More specifically, in applications where the magnetic circuit is displaced along the longitudinal axis L, the sensor housing must be sized not only to accommodate the axial dimension of the magnetic circuit, but must also be sized to accommodate for the axial travel of the magnetic circuit. As should be appreciated, if the magnetic circuit remains in a stationary position, the axial dimension of the sensor housing can be reduced by up to about 40–50%. It should also be understood that in other embodiments of the invention, relative displacement between the MR element 60 and the magnetic field may be accomplished by displacing both the magnetic circuit 27 and the MR sensor 28 in the same direction or in opposite direction relative to one another and/or at the same rate or at different rates relative to one another.

A wide variety of mechanisms for providing relative displacement between the magnetic circuit 27 and the MR sensor 28 are known to those skilled in the art, and therefore need not be discussed in detail herein. Such mechanisms include, for example, various types of carrier mechanisms, rotors, shafts, linkages, slides and/or brackets. In one particular embodiment of the invention, the magnetic circuit 27 is slidably displaceable along a pair of opposing guide tracks or grooves (not shown) that are aligned generally parallel with the longitudinal axis L and which are sized to receive the axial walls 50, 52 of the loop pole piece 26 therein. An actuator lever arm (not shown) may be coupled to one of the lateral walls 54, 56 of the loop pole piece 26 to exert an axial force onto the magnetic circuit 27 to displace the magnetic circuit 27 generally along the longitudinal axis L. In another particular embodiment of the invention, the MR sensor assembly 28 is coupled to a carrier mechanism that is configured to displace the MR sensor assembly 28 generally along the longitudinal axis L. It should be understood that other types of mechanisms may be used to provide relative displacement between the magnetic circuit 27 and the MR sensor 28, the details of which would be apparent to those skilled in the art.

Illustrated in FIG. 2 are two operational positions of the MR sensor 28 along the longitudinal axis L, indicated as operational positions A and B. When located at operational position A, the magnitude of the magnetic flux density passing through the sensing plane S of the MR element 60 will be at its minimum value (i.e., 1050 Gauss). However, as the MR element 60 is relatively displaced along the air gap G in the direction of arrow 90, toward operational position B, the magnitude of magnetic flux density passing through the sensing plane S correspondingly increases. When located at operational position B, the magnitude of the magnetic flux density passing through the sensing plane S of MR element 60 will be at its maximum value (i.e., 1450 Gauss). As should be apparent, the MR sensor 28 may also be relatively displaced along the air gap G in a direction opposite that of arrow 90 (i.e., toward operational position A), wherein the magnetic flux density passing through the sensing plane S will correspondingly decrease in magnitude.

As the MR element 60 is relatively displaced through the air gap G in the direction of arrow 90 along the longitudinal axis L, the resistance provided by the MR element 60 will change in accordance with the varying magnitude of magnetic flux density strength passing therethrough. More specifically, as the magnitude of the magnetic flux density field passing through the MR element 60 increases, the resistance provided by the MR element 60 will correspondingly increase. As a result, the amount of resistance provided by the MR element 60 is representative of the particular axial position of the MR sensor 28 along the air gap G relative to the primary magnetic circuit 27. The varying resistance provided by the MR element 60 correspondingly effects the voltage signal output at output node 82 of the electronic circuit illustrated in FIG. 7. Specifically, as the resistance of the MR element 60 is increased, the voltage signal output is resultingly decreased.

It is relatively well known that the thermal coefficient of resistance (hereafter "TCR") of an MR element changes as the magnetic flux density passing through the MR element is varied. This phenomenon is particularly apparent when dealing with relatively low ranges or levels of magnetic flux density field strength. As a result, the predetermined relationship between the amount of resistance provided by the MR element 60 and the sensed magnitude of magnetic flux density may be negatively effected if the effects of varying TCR are not accounted for. Providing a second MR element 62 and exposing the MR element 62 to a relatively constant or fixed magnetic flux density field strength tends to compensate for the effects caused by changes in the TCR of the MR element 60. The MR element 62 essentially serves to provide a relatively constant bias to the electronic circuit to compensate for variations in the TCR of the MR element 60.

As described above, the auxiliary magnetic circuit 70 generates a magnetic field that supplies a relatively constant magnetic flux density field strength to the MR element 62. To maximize the effects of the MR element 62, the magnetic flux density field strength directed through the MR element 62 is preferably substantially equal to the average magnetic flux density field strength passing through the MR element 60 as the MR element 60 is displaced between the operational positions A and B (i.e., the magnetic flux density strength at the midpoint of travel between operational positions A and B). As discussed above, in one embodiment of the invention, the fixed magnetic flux density field strength directed through the MR element 62 is about 1250 Gauss, and the average magnetic flux density field strength passing through the MR element 60 is 1250 Gauss+/−200 Gauss. However, it should be understood that other magnitudes and ranges of magnetic flux density field strength are also contemplated as falling within the scope of the present invention.

Figure 9:
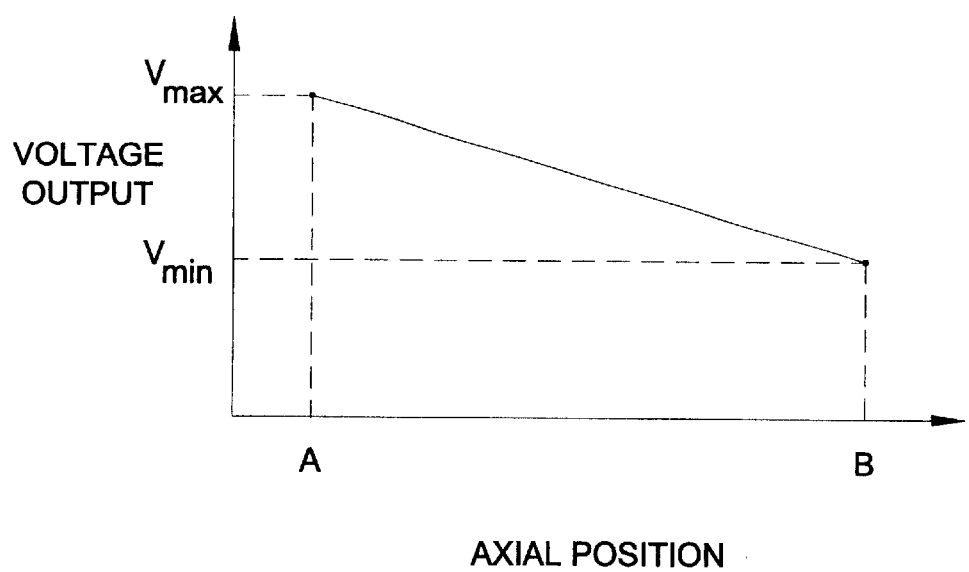
FIG. 9 is a graph depicting electronic signal output as a function of axial position along the sensing path of the magnetic position sensor illustrated in FIG. 1.

As should now be appreciated, the voltage output signal provided at output node 82 will be proportional to the magnitude of the sensed magnetic flux density field strength, which as discussed above is uniquely representative of the particular axial position of the MR sensor 28 relative to the magnetic field generated by the primary magnetic circuit 27. Referring to FIG. 9, shown therein is a graph depicting change in the voltage signal output generated by the MR sensor 28 as a function of its axial position along the longitudinal axis L relative to the primary magnetic circuit 27. Notably, the voltage signal output of the MR sensor 28 varies in a substantially linear manner as the MR sensor 28 is displaced relative to the magnetic field provided by the magnetic circuit 27. Preferably, the linear relationship between the axial position of the MR sensor 28 and the representative voltage output signal exhibits less than +/−1% deviation from a best-fit straight line. Notably, the effect of variations in the TCR of the MR element 60 is minimized by the inclusion of the constantly biased MR element 62. Any remaining effects caused by varying TCR can be eliminated by signal conditioning, such as, for example, by programmable operational amplifier (not shown).

In one embodiment of the present invention, the change in voltage signal output as the MR sensor 28 is relatively displaced between the operational positions A and B (FIG. 2) is about 0.45 Volts, having a maximum voltage output of $V_{MAX}$ and a minimum voltage output of $V_{MIN}$. The voltage signal output at output node 82 may then be passed through a programmable operational amplifier (not shown) to generate a final output voltage falling within a range between about 0.5 Volts to about 4.5 Volts, the details of which would be known to those of skill in the art. Although specific levels and ranges of voltage signals have been disclosed herein, is should be understood that such values are for illustrative purposes only, and that other levels and ranges of voltage signals are also contemplated as falling within the scope of the present invention.

As mentioned above, it is well known that the TCR of an MR element changes as the magnetic flux density passing therethrough is varied. However, if the magnetic flux density passing through the MR element remains constant, the MR element can be used to generate an electronic signal representative of the surrounding ambient temperature. Notably, since the MR element 62 of the MR sensor 28 is exposed to a relatively constant magnetic flux density field strength via the auxiliary magnetic circuit 70, the MR element 62 can be used to generate an electronic signal representative of the ambient temperature adjacent the position sensor 20. Therefore, in addition to compensating for variations in the TCR of the MR element 60, the MR element 62 can also be used as a temperature sensing device to monitor the ambient temperature adjacent the position sensor 20.

Figure 10:
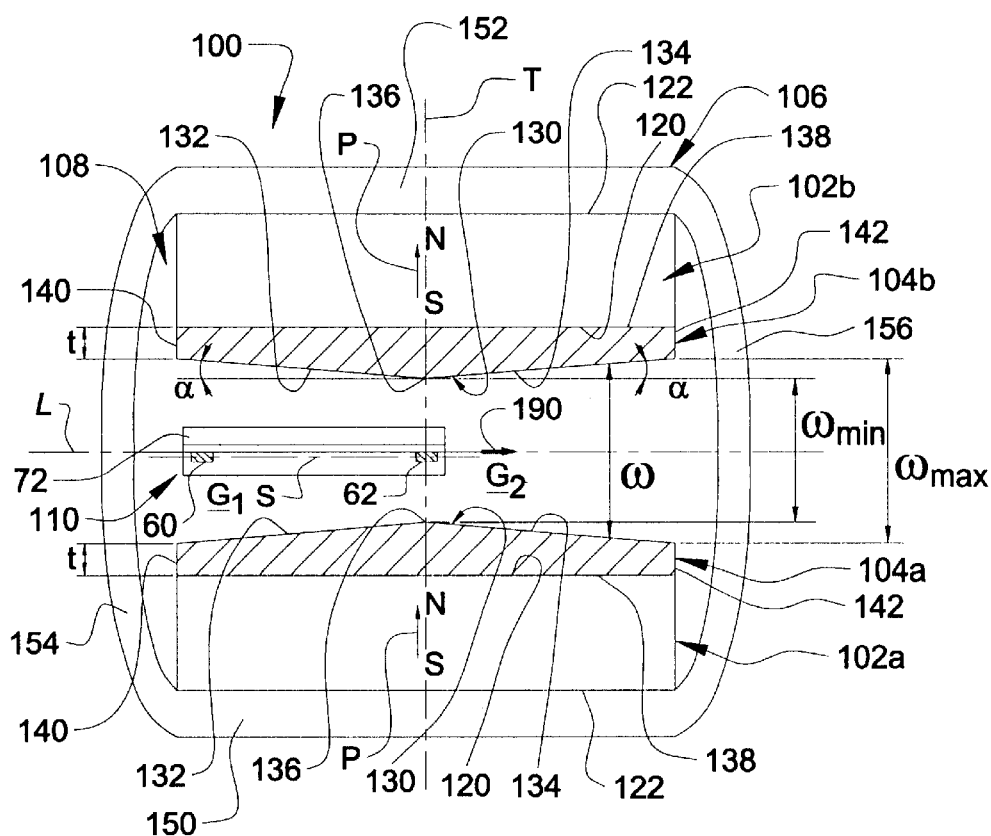
FIG. 10 is a top plan view of a magnetic position sensor according to another form of the present invention.
Figure 11:
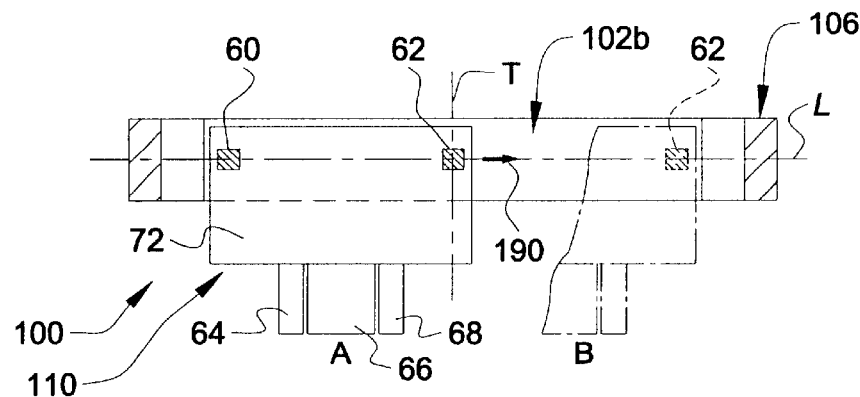
FIG. 11 is a sectional view of the magnetic position sensor illustrated in FIG. 10.

Referring now to FIGS. 10 and 11, shown therein is a magnetic position sensor 100 according to another form of the present invention. The magnetic sensor 100 includes a magnetic circuit that is generally comprised of a pair of magnets 102a, 102b, a pair of shaped pole pieces 104a, 104b, and a magnetically permeable bracket or loop pole piece 106. The magnets 102a, 102b, the shaped pole pieces 104a, 104b, and the loop pole piece 106 cooperate with one another to provide a closed magnetic circuit 108 that generates a magnetic field having a magnetic flux density field strength that varies along an air gap extending generally along a longitudinal axis L. The magnetic sensor 100 also includes a sensing device 110 that is operable to sense varying magnitudes of the magnetic flux density field generated by the magnetic circuit 108 and to generate an output signal representative of the sensed magnitude of magnetic flux density. Although the magnetic sensor 100 is configured as a linear position sensor (e.g., a sensor having a sensing path extending along a substantially linear axis), it should be understood that the magnetic sensor 100 could be alternatively configured for use in other applications as well, such as, for example, a rotary position sensor (e.g., a sensor having a sensing path extending along an arcuate or circular axis).

In one embodiment of the present invention, the magnets 102a, 102b are configured similar to the magnets 22a, 22b of sensor 20. Specifically, magnets 102a, 102b are rare earth magnets having a substantially rectangular configuration. However, as discussed above, other types of magnets having different material compositions, shapes and configurations are also contemplated as falling within the scope of the present invention. The magnets 102a, 102b preferably have a substantially identical shape and configuration. Therefore, like features of the magnets 102a, 102b will be referred to using the same reference numerals.

The magnets 102a, 102b each preferably include an inwardly facing axial surface 120 and an outwardly facing axial surface 122, with the inner surface 120 of magnet 102a facing and arranged generally opposite the inner surface 120 of magnet 102b to define an axial spacing therebetween. In a preferred embodiment, the inner surfaces 120 of magnets 102a, 102b are of opposite polarity to generate a magnetic field flowing between the magnets 102a, 102b and across the air gap. In the illustrated embodiment, the inner and outer surfaces 120, 122 of magnet 102a are north and south pole surfaces, respectively, and the inner and outer surfaces 120, 122 of magnet 102b are south and north pole surfaces, respectively. As a result, the magnets 102a, 102b are polarized in the same polarization direction P. However, it should also be understood that other magnetic polarization arrangements are also contemplated as falling within the scope of the present invention. For example, the polarization direction P of one or both of the magnets 102a, 102b may be reversed to provide alternative magnetic circuit set-ups.

In a preferred embodiment of the present invention, the shaped pole pieces 104a, 104b are formed of a magnetically permeable material, such as, for example, soft magnetic steel or CRS. However, as discussed above with regard to shaped pole pieces 24a, 24b, other magnetically permeable materials are also contemplated as falling within the scope of the present invention. Additionally, the shaped pole pieces 104a, 104b preferably have a substantially identical shape and configuration. Therefore, like features of the pole pieces 104a, 104b will be referred to using the same reference numerals.

Each of the shaped pole pieces 104a, 104b preferably defines an irregular or non-rectangular shape having a varying axial thickness t. In one embodiment of the present invention, each of the shaped pole pieces 104a, 104b has a triangular or prism shape. Specifically, each of the shaped pole pieces 104a, 104b preferably includes an inwardly facing surface 130 including a first tapered portion 132 and a second tapered portion 134, with the first and second tapered portions 132, 134 converging at an apex or pinnacle 136. Each of the shaped pole pieces 104a, 104b also preferably includes an outwardly facing axial surface 138 and a pair of opposite end surfaces 140, 142. The outer surfaces 138 are preferably positioned adjacent the inner axial surfaces 120 of magnets 102a, 102b, respectively, and are preferably adjoined thereto by any method know to those of ordinary skill in the art. The tapered portions 132, 134 of inner surface 130 are preferably sloped at an acute angle α relative to the longitudinal axis L. In a specific embodiment, the angle α falls within a range of about 1 degree to about 20 degrees, and in a more specific embodiment angle α is approximately 10 degrees. However, it should be understood that other acute angles α are also contemplated as falling within the scope of the present invention, including angles α less than 1 degree or greater than 20 degrees.

Although the tapered portions 132, 134 of inner surfaces 130 are illustrated as being substantially planar, it should be understood that other configurations are also contemplated, including those alternative configurations discussed above with regard to the shaped pole pieces 24a, 24b. As illustrated in FIG. 10, the shaped pole pieces 104a, 104b are preferably configured and arranged in a substantially symmetrical relationship relative to the longitudinal axis L. Additionally, the shaped pole pieces 104a, 104b are preferably configured and arranged in a substantially symmetrical relationship relative to a transverse axis T oriented substantially perpendicular to the longitudinal axis L and extending through the apex 136. As a result, the air gap defined between the shaped pole pieces 104a, 104b is substantially symmetrical relative to the longitudinal axis L and the transverse axis T.

The tapered portions 132 of pole pieces 104a, 104b are preferably arranged generally opposite one another to define an air gap $G_1$ therebetween having a width w that varies along the longitudinal axis L, with the distance between the tapered portions 132 adjacent ends 140 defining a maximum gap width $w_{MAX}$, and with the distance between the apices 136 defining a minimum gap width $w_{MIN}$. Likewise, the tapered portions 134 of pole pieces 104a, 104b are preferably arranged generally opposite one another to define an air gap $G_2$ therebetween having a width w that varies along the longitudinal axis L, with the distance between the tapered portions 134 adjacent ends 142 defining a maximum gap width $w_{MAX}$, and with the distance between the apices 136 defining a minimum gap width $w_{MIN}$. In other words, the air gap $G_1$ defines a converging air gap width w extending along axis L, while the air gap $G_2$ defines a diverging air gap width w extending along axis L. Although the air gaps $G_1$ and $G_2$ have been illustrated and described as having a particular shape and configuration, it should be understood that other shapes and configurations are also contemplated, such as those alternative shapes and configurations described above with regard to air gap G of sensor 20.

Figure 12:
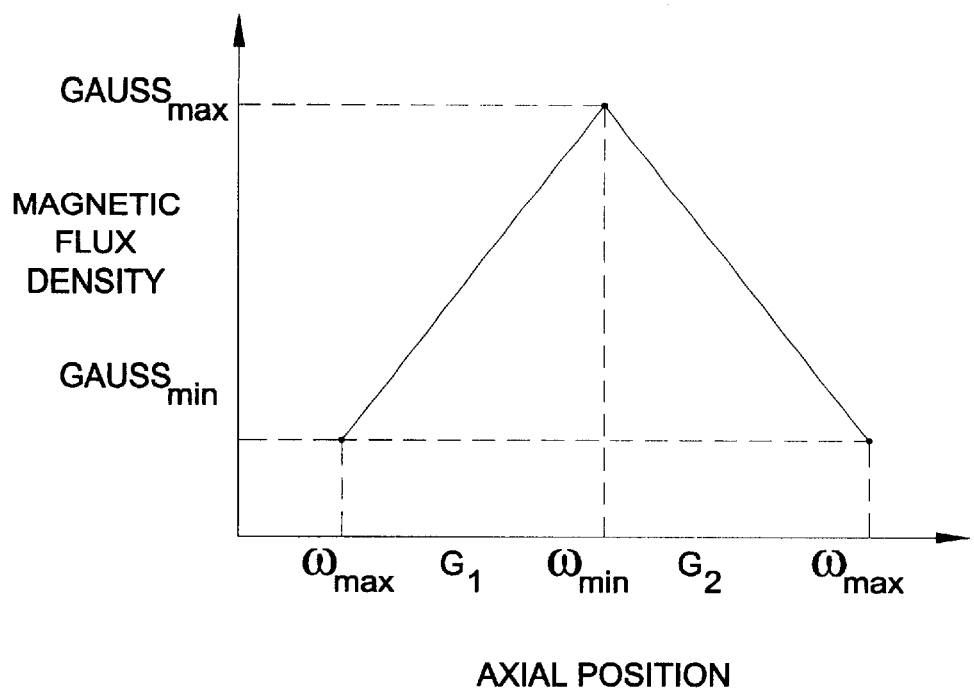
FIG. 12 is a graph depicting magnetic flux density along a sensing path of the magnetic position sensor illustrated in FIG. 10 as a function of axial position along the sensing path.

The magnets 102a, 102b and the shaped pole pieces 104a, 104b cooperate to generate a magnetic field within each of the air gaps $G_1$ and $G_2$ having a magnetic flux density field strength that varies along the longitudinal axis L. Such variation in the magnitude of the magnetic flux density field is primarily dictated by the varying thickness t of the shaped pole pieces 104a, 104b and the varying width w of the air gaps $G_1$ and $G_2$. Preferably, the magnetic flux density field strength varies in a substantially linear manner along each of the air gaps $G_1$ and $G_2$. As should be appreciated, the symmetrical configuration and arrangement of the magnets 102a, 102b and the shaped pole pieces 104a, 104b provides a balanced magnetic circuit 108 relative to both the longitudinal axis L and the transverse axis T. As shown in FIG. 12, the magnetic flux density field strength within the air gap $G_1$ is at a minimum at a location adjacent ends 140 of pole pieces 104a, 104b, which corresponds to the maximum gap width $w_{MAX}$ of air gap $G_1$. Similarly, the magnetic flux density field strength within the air gap $G_2$ is at a minimum at a location adjacent ends 142 of pole pieces 104a, 104b, which corresponds to the maximum gap width $w_{MAX}$ of air gap $G_2$. The magnetic flux density field strength is at a maximum in the area where the air gaps $G_1$ and $G_2$ converge (i.e., adjacent the apices 136), which corresponds to the minimum gap width $w_{MIN}$ of the air gaps $G_1$ and $G_2$. As should be appreciated, the strength of the magnetic flux density field along the air gaps $G_1$ and $G_2$ is inversely proportional to the gap width w.

In a preferred embodiment of the present invention, the magnets 102a, 102b and the shaped pole pieces 104a, 104b are surrounded by a loop pole piece 106. Preferably, the loop pole piece 106 is formed of a magnetically permeable material, such as, for example, soft magnetic steel or CRS. However, other suitable magnetically permeable materials are also contemplated. In the illustrated embodiment of the invention, the loop pole piece 106 is configured similar to the loop pole piece 26 illustrated and described above with regard to sensor 20. Specifically, the loop pole piece 106 has an oval-rectangular configuration, including a pair of opposite axial walls 150, 152 and a pair of opposite arcuate walls 154, 156 interconnecting the axial walls 150, 152. However, as should be appreciated, other suitable configurations are also contemplated. The outer axial surfaces 122 of magnets 102a, 102b are preferably positioned adjacent the axial walls 150, 152 of loop pole piece 106, respectively, and are preferably adjoined thereto by any method know to those of ordinary skill in the art. It should be understood, however, that the inclusion of a loop pole piece 106 is not necessarily required for proper operation of the sensor 100, and that alternative embodiments of sensor 100 do not include a loop pole piece 106.

The magnetic flux sensor 110 is positioned within the air gap between the shaped pole pieces 104a, 104b and is operable to sense varying magnitudes of magnetic flux density field strength along the longitudinal axis L and to generate an output signal indicative of the sensed magnitude of magnetic flux density. In a preferred embodiment of the present invention, the magnetic flux sensor 110 is an MR-type sensor; however, other types of magnetic flux sensors are also contemplated for use with the present invention, such as, for example, a Hall-effect sensor, a magnetic diode, or any other magnetic field-sensitive sensor that would occur to one of ordinary skill in the art.

The MR sensor assembly 110 preferably has the same basis configuration as the MR sensor assembly 28 illustrated and described above with regard to magnetic position sensor 20. Similar to the MR sensor assembly 28, the MR sensor assembly 110 is generally comprised of a pair of MR elements 60, 62 and a number of conductors 64, 66, 68 for electrically interconnecting the MR elements 60, 62. Likewise, the MR elements 60, 62 are interconnected using the same basic electronic circuit illustrated in FIG. 7. Additionally, the components of the MR sensor 110 are preferably encased in a plastic molding material 72 so as to define a substantially rectangular-shaped body. However, unlike the MR sensor assembly 28, the MR sensor assembly 110 does not include an auxiliary magnetic circuit associated with the MR element 62. Instead, the MR element 62 is positioned within the varying magnetic flux density field generated by the magnetic circuit 108.

Having discussed the features associated with the various components of the magnetic position sensor 100, reference will now be made to the operation of sensor 100 according to one embodiment of the present invention. As discussed above, the magnetic field generated by the magnetic circuit 108 produces a magnetic flux density field strength that preferably varies in a substantially linear manner along the air gaps $G_1$ and $G_2$. The MR element 60 of the MR sensor 110 is primarily disposed within the air gap $G_1$ and is operable to sense varying magnitudes of magnetic flux density along longitudinal axis L. The MR element 62 of the MR sensor 110 is primarily disposed within the air gap $G_2$ and is also operable to sense varying magnitudes of magnetic flux density along longitudinal axis L. The MR elements 60, 62 are preferably generally aligned along a magnetic flux sensing plane S arranged and oriented such that flux lines extending across the air gaps $G_1$ and $G_2$ preferably pass perpendicularly through the sensing plane S. However, it should be understood that other orientations of the sensing plane S are also contemplated as falling within the scope of the present invention.

As should be appreciated, as the MR sensor 110 is relatively displaced through the air gaps $G_1$ and $G_2$ and along the longitudinal axis L, varying magnitudes of magnetic flux density will pass through the MR elements 60, 62. The varying magnitudes of magnetic flux density passing through MR elements 60, 62 will correspondingly change the resistive values associated with each of the MR elements 60, 62, which in turn effects a change in the voltage output signal that is indicative of the particular axial position of the MR sensor 110 relative to the magnetic field provided by the magnetic circuit 108. In a preferred embodiment of the present invention, relative displacement between the MR sensor 110 and the magnetic field generated by the magnetic circuit 108 is accomplished by maintaining the MR sensor 110 in a stationary position while displacing the magnetic circuit 108 along the longitudinal axis L. However, other configurations are also contemplated, such as those alternative configurations described above with regard to sensor 20. Mechanisms for providing such relative displacement between the magnetic circuit 108 and the MR sensor 110 are known to those skilled in the art, and therefore need not be discussed in detail herein.

Illustrated in FIG. 11 are two operational positions of the MR sensor 110 along the longitudinal axis L, indicated therein as operational positions A and B. In operational position A, the MR element 60 is disposed adjacent ends 140 of pole pieces 104a, 104b, while the MR element 62 is disposed adjacent the apices 136 of pole pieces 104a, 104b. In operational position B, the MR element 60 is disposed adjacent the apices 136 of pole pieces 104a, 104b, while the MR element 62 is disposed adjacent ends 142 of pole pieces 104a, 104b.

When the MR sensor 110 is located at operational position A, the magnitude of the magnetic flux density passing through the sensing plane S of the MR element 60 will be at its minimum value, while the magnitude of the magnetic flux density passing through the sensing plane S of the MR element 62 will be at its maximum value. However, as the MR sensor 110 is relatively displaced along the longitudinal axis L in the direction of arrow 190, toward operational position B, the magnitude of magnetic flux density passing through the MR element 60 will correspondingly increase, while the magnitude of the magnetic flux density passing through the MR element 62 will correspondingly decrease. As should be appreciated, the change in magnetic flux density passing through the MR element 60 will be inversely proportional to the change in magnetic flux density passing through the MR element 62. When the MR sensor 110 is located at operational position B, the magnitude of the magnetic flux density passing through MR element 60 will be at its maximum value, while the magnitude of the magnetic flux density passing through the MR element 62 will be at its minimum value. As should be apparent, the MR sensor 110 may also be relatively displaced along the longitudinal axis L in a direction opposite that of arrow 190 (i.e., toward operational position A), wherein the magnitude of magnetic flux density passing through the MR element 60 will decrease while the magnitude of magnetic flux density passing through the MR element 62 will correspondingly increase.

As the MR sensor 110 is relatively displaced through the air gaps $G_1$ and $G_2$ along longitudinal axis L, the resistance provided by the MR elements 60, 62 will change in accordance with the varying magnitude of magnetic flux density strength passing therethrough. The varying resistance provided by the MR elements 60, 62 correspondingly effects the voltage signal output at output node 82 of the electronic circuit illustrated in FIG. 7. Notably, since the varying amount of magnetic flux density field strength passing through the MR element 60 is inversely proportional to the varying amount of magnetic flux density field strength passing through the MR element 62, the effects relating to changes in the TCR associated with each the MR elements 60, 62 is substantially canceled out.

Figure 13:
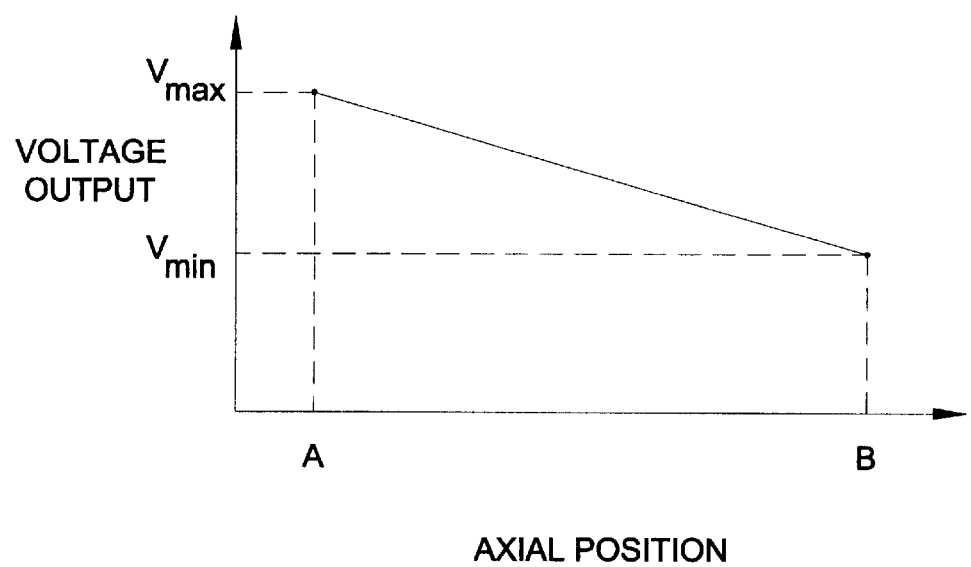
FIG. 13 is a graph depicting electronic signal output as a function of axial travel along the sensing path of the magnetic position sensor illustrated in FIG. 10.

As should be appreciated, the voltage signal output provided at output node 82 is uniquely representative of the particular axial position of the MR sensor 110 along the longitudinal axis L relative to the magnetic circuit 108. Referring to FIG. 13, shown therein is a graph depicting change in the voltage signal output generated by the MR sensor 110 as a function of the axial position of the MR sensor 110 relative to the magnetic circuit 108. The voltage signal output of the MR sensor 110 preferably varies in a substantially linear manner as the MR sensor 110 is displaced relative to the magnetic field provided by the magnetic circuit 108. In one embodiment of the invention, the change in voltage signal output at output node 82 as the MR sensor 110 is relatively displaced between the operational positions A and B (FIG. 11) is about 1 Volt, having a maximum voltage output $V_{MAX}$ and a minimum voltage output $V_{MIN}$. The voltage signal output at output node 82 may then be fed through a programmable operational amplifier (not shown) to generate a final output voltage falling within a range between about 0.5 Volts to about 4.5 Volts, the details of which would be known to those of skill in the art. Although specific levels and ranges of voltage signals have been disclosed herein, is should be understood that such values are for illustrative purposes only, and that other levels and ranges of voltage signals are also contemplated as falling within the scope of the present invention.

Figure 14:
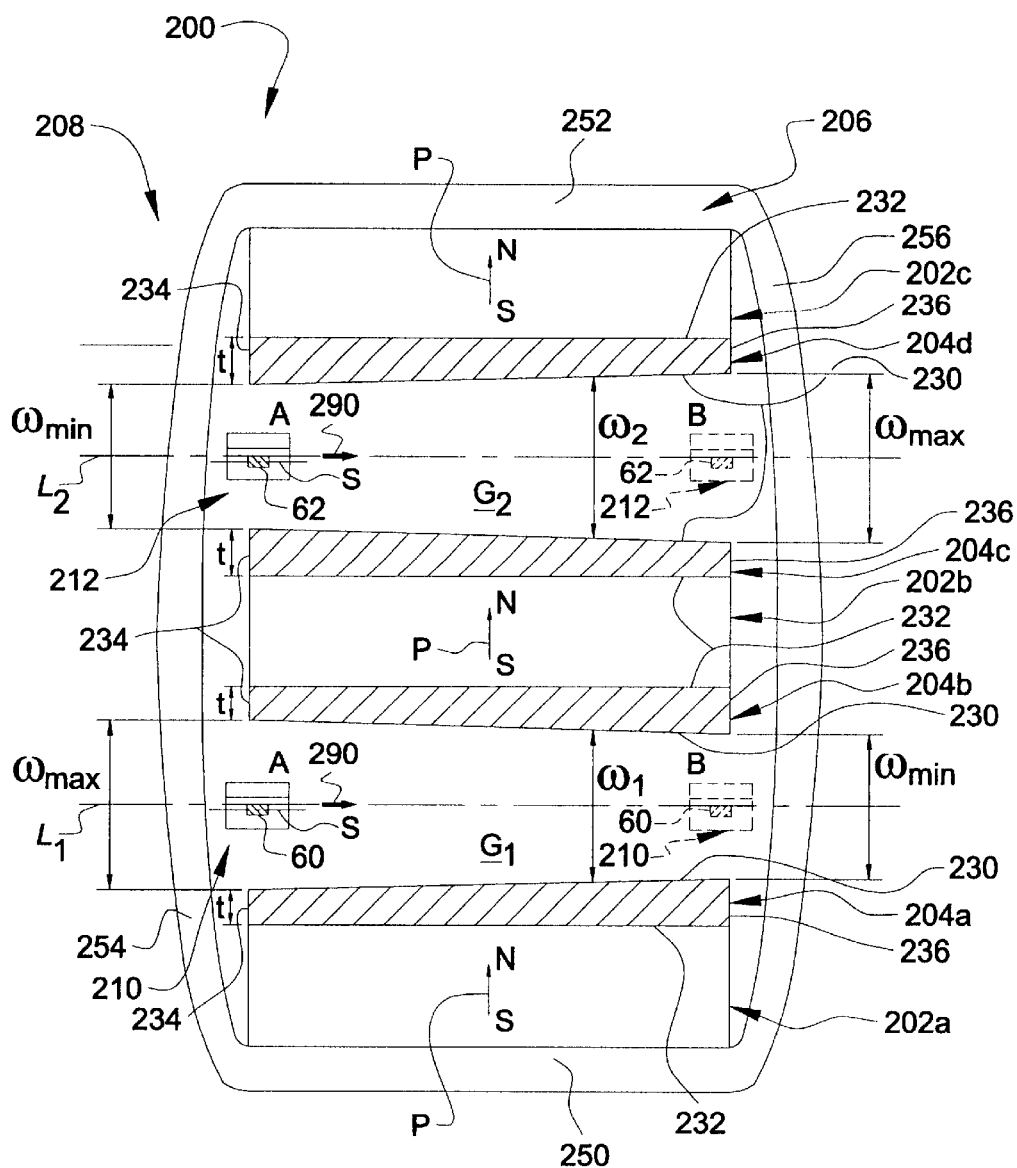
FIG. 14 is a top plan view of a magnetic position sensor according to another form of the present invention.

Referring now to FIG. 14, shown therein is a magnetic position sensor 200 according to another form of the present invention. The position sensor 200 is generally comprised of a three magnets 202a, 202b, 202c, four shaped pole pieces 204a, 204b, 204c, 204d, and a magnetically permeable bracket or loop pole piece 206. The magnets 202a, 202b, 202c are preferably substantially identical to magnets 102a, 102b of sensor 100. The shaped pole pieces 204a, 204b are preferably configured similar to that of the first tapered portions 132 of pole pieces 104a, 104b, while the shaped pole pieces 204c, 204d are preferably configured similar to that of the second tapered portions 134 of pole pieces 104a, 104b. The loop pole piece 206 is preferably configured similar to that of loop pole pieces 106 of sensor 100, including a pair of opposite axial walls 250, 252 and a pair of opposite lateral walls 254, 256.

The magnets 202a–c, the shaped pole pieces 204a–d, and the loop pole piece 206 cooperate with one another to provide a closed magnetic circuit 208 that generates a first magnetic field having a magnetic flux density field strength that linearly varies along a first air gap $G_1$ extending generally along a first longitudinal axis $L_1$, and a second magnetic field having a magnetic flux density field strength that linearly varies along a second air gap $G_2$ extending generally along a second longitudinal axis $L_2$. The magnetic sensor 200 also includes a first sensing device 210 that is operable to sense varying magnitudes of the magnetic flux density field along the first air gap $G_1$ and to generate an output signal representative of the sensed magnitude of magnetic flux density, and a second sensing device 212 that is operable to sense varying magnitudes of the magnetic flux density field along the second air gap $G_2$ and to generate an output signal representative of the sensed magnitude of magnetic flux density.

The position sensor 200 has a somewhat different configuration than that of the position sensor 100 illustrated and described above. It should nevertheless be appreciated that the position sensor 200 has the same basis operating principles as that of sensor 100. However, instead of providing an air gap having first and second variable width air gaps $G_1$ and $G_2$ disposed along a common longitudinal axis L, the position sensor 200 is configured and arranged to include the first and second variable width air gaps $G_1$ and $G_2$ positioned laterally adjacent one another along a pair longitudinal axes $L_1$ and $L_2$. In a preferred embodiment of the invention, the longitudinal axes $L_1$ and $L_2$ are arranged substantially parallel to one another; however, other arrangements are also contemplated as falling within the scope of the present invention.

In a preferred embodiment of the invention, the magnets 202a–c are all polarized in the same polarization direction P so as to provide a first magnetic field flowing between the magnets 202a and 202b and across the air gap $G_1$, and a second magnetic field flowing between the magnets 202b and 202c and across the air gap $G_2$. The shaped pole pieces 204a–d each preferably define an irregular or non-rectangular shape having a varying axial thickness t. In one embodiment of the invention, each of the shaped pole pieces 204a–d has a wedge or ramp shape. Specifically, each of the pole pieces 204a–d preferably includes a tapered surface 230 facing inwardly toward a respective air gap $G_1$ and $G_2$, an axial surface 232 that is preferably adjoined to an adjacent axial surface of a respective magnet 202a–c, and a pair of opposite end surfaces 234, 236.

The shaped pole pieces 204a, 204b are preferably configured and arranged in a substantially symmetrical relationship relative to the first longitudinal axis $L_1$, and the shaped pole pieces 204c, 204d are preferably configured and arranged in a substantially symmetrical relationship relative to the second longitudinal axis $L_2$. As a result, the air gaps $G_1$ and $G_2$ will likewise be substantially symmetrical relative to the longitudinal axes $L_1$ and $L_2$, respectively. The shaped pole pieces 204a, 204b are preferably arranged generally opposite one another to define the air gap $G_1$ therebetween having a width $w_1$ that varies along the longitudinal axis $L_1$, with the distance between the tapered surfaces 230 adjacent ends 234 defining a maximum gap width $w_{MAX}$, and with the distance between the tapered surfaces 230 adjacent ends 236 defining a minimum gap width $w_{MIN}$. Similarly, the shaped pole pieces 204c, 204d are preferably arranged generally opposite one another to define the air gap $G_2$ therebetween having a width $w_2$ that varies along the longitudinal axis $L_2$, with the distance between the tapered surfaces 230 adjacent ends 234 defining a minimum gap width $w_{MIN}$, and with the distance between the tapered surfaces 230 adjacent ends 236 defining a maximum gap width $w_{MAX}$. In other words, the air gap $G_1$ defines a converging air gap width $w_1$ extending along axis $L_1$, while the air gap $G_2$ defines a diverging air gap width $w_2$ extending along axis $L_2$.

The magnets 202a, 202b and the shaped pole pieces 204a, 204b cooperate to generate a magnetic field within the air gap $G_1$ having a magnetic flux density field strength that varies along the longitudinal axis $L_1$, while the magnets 202b, 202c and the shaped pole pieces 204c, 204d cooperate to generate a magnetic field within the air gap $G_2$ having a magnetic flux density field strength that varies along the longitudinal axis $L_2$. Such variation in the magnitude of the magnetic flux density field strength is primarily dictated by the varying thickness t of the shaped pole pieces 204a–d and the varying widths $w_1$ and $w_2$ of the air gaps $G_1$ and $G_2$. As should be appreciated, the strength of the magnetic flux density field along the air gaps $G_1$ and $G_2$ is inversely proportional to the air gap widths $w_1$ and $w_2$.

The magnetic flux sensor 210 is positioned within the air gap $G_1$ and is operable to sense varying magnitudes of magnetic flux density along the longitudinal axis $L_1$ and to generate an output signal indicative of the sensed magnitude of magnetic flux density. Similarly, the magnetic flux sensor 212 is positioned within the air gap $G_2$ and is operable to sense varying magnitudes of magnetic flux density along the longitudinal axis L2 and to generate an output signal indicative of the sensed magnitude of magnetic flux density. In a preferred embodiment of the present invention, the magnetic flux sensors 210, 212 are MR-type sensors; however, other types of magnetic flux sensors are also contemplated for use with the present invention. Although the structural configuration of the MR sensors 210, 212 is somewhat different than that of the MR sensor 110, the MR sensors 210, 212 operate in a manner similar to that of the MR sensor 110. In a preferred embodiment of the invention, the MR sensors 210, 212 are generally comprised of a pair of MR elements 60, 62 that are interconnected using the electronic circuit illustrated in FIG. 7.

Having discussed the features associated with the various components of the magnetic position sensor 200, reference will now be made to the operation of sensor 200 according to one embodiment of the present invention. As discussed above, the magnetic field generated by the magnetic circuit 208 produces a magnetic flux density field strength that preferably varies in a substantially linear manner along the air gaps $G_1$ and $G_2$. The MR element 60 of sensor 210 is disposed within the air gap $G_1$ and is operable to sense varying magnitudes of the magnetic flux density along longitudinal axis $L_1$. Similarly, the MR element 62 of sensor 212 is disposed within the air gap $G_2$ and is operable to sense varying magnitudes of the magnetic flux density along longitudinal axis $L_2$.

As should be appreciated, as the MR sensors 210, 212 are relatively displaced through the air gaps $G_1$ and $G_2$ and along the respective axes $L_1$, $L_2$, varying magnitudes of magnetic flux density will pass through the MR elements 60, 62. The varying magnitudes of magnetic flux density passing through MR elements 60, 62 will correspondingly change the resistive values associated with each of the MR elements 60, 62. Such changes in the resistance provided by the MR elements 60, 62 will in turn effect a change in the voltage output signal that is indicative of the particular axial position of the MR sensors 210, 212 relative to the magnetic fields provided by the magnetic circuit 208. In a preferred embodiment of the present invention, relative displacement between the MR sensors 210, 212 and the magnetic circuit 208 is accomplished by maintaining the MR sensor 210, 212 in a stationary position while displacing the magnetic circuit 208 in an axial direction substantially parallel with the longitudinal axes $L_1$, $L_2$. Such an arrangement will result in the simultaneous relative displacement of the MR sensors 210, 212 along axes $L_1$, $L_2$.

Illustrated in FIG. 14 are two operational positions of the MR sensors 210, 212 along the longitudinal axes $L_1$, $L_2$, indicated therein as operational positions A and B. When in operational position A, the magnitude of the magnetic flux density passing through the sensing plane S of the MR element 60 will be at its minimum value, while the magnitude of the magnetic flux density passing through the sensing plane S of the MR element 62 will be at its maximum value. However, as the MR sensors 210, 212 are relatively displaced along the longitudinal axes $L_1$, $L_2$ in the direction of arrow 290, toward operational position B, the magnitude of magnetic flux density passing through the MR element 60 will correspondingly increase, while the magnitude of the magnetic flux density passing through the MR element 62 will correspondingly decrease. As should be appreciated, the change in magnetic flux density passing through the MR element 60 will be inversely proportional to the change in magnetic flux density passing through the MR element 62. When the MR sensors 210, 212 are located at operational position B, the magnitude of the magnetic flux density passing through the MR element 60 will be at its maximum value, while the magnitude of the magnetic flux density passing through the MR element 62 will be at its minimum value. As should be apparent, the MR sensors 210, 212 may also be relatively displaced along the longitudinal axes $L_1$ and $L_2$ in a direction opposite that of arrow 290 (i.e., toward operational position A), wherein the magnitude of magnetic flux density passing through MR element 60 will correspondingly decrease while the magnitude of magnetic flux density passing through MR element 62 will correspondingly increase.

As the MR sensors 210, 212 are relatively displaced along the air gaps $G_1$ and $G_2$, respectively, the resistance provided by the MR elements 60, 62 will change in accordance with the varying magnitude of magnetic flux density strength passing therethrough. The varying resistance provided by the MR elements 60, 62 correspondingly effects the voltage signal output at output node 82 of the electronic circuit illustrated in FIG. 7. Notably, since the varying amount of magnetic flux density field strength passing through the MR element 60 is inversely proportional to the varying amount of magnetic flux density field strength passing through the MR element 62, the effects relating to changes in the TCR associated with each the MR elements 60, 62 is effectively canceled out.

As should be appreciated, the voltage signal output provided at output node 82 is uniquely representative of the particular axial position of the MR sensors 210, 212 along the longitudinal axes $L_1$, $L_2$ relative to the magnetic circuit 208. The change in voltage signal output as a function of relative linear displacement or travel of the MR sensors 210, 212 along the longitudinal axes $L_1$, $L_2$ will be similar if not identical that depicted in the graph illustrated in FIG. 13. The change in the voltage signal output of the MR sensors 210, 212 preferably varies in a substantially linear manner as the MR sensors 210, 212 are axially displaced relative to the magnetic circuit 208.

Figure 15:
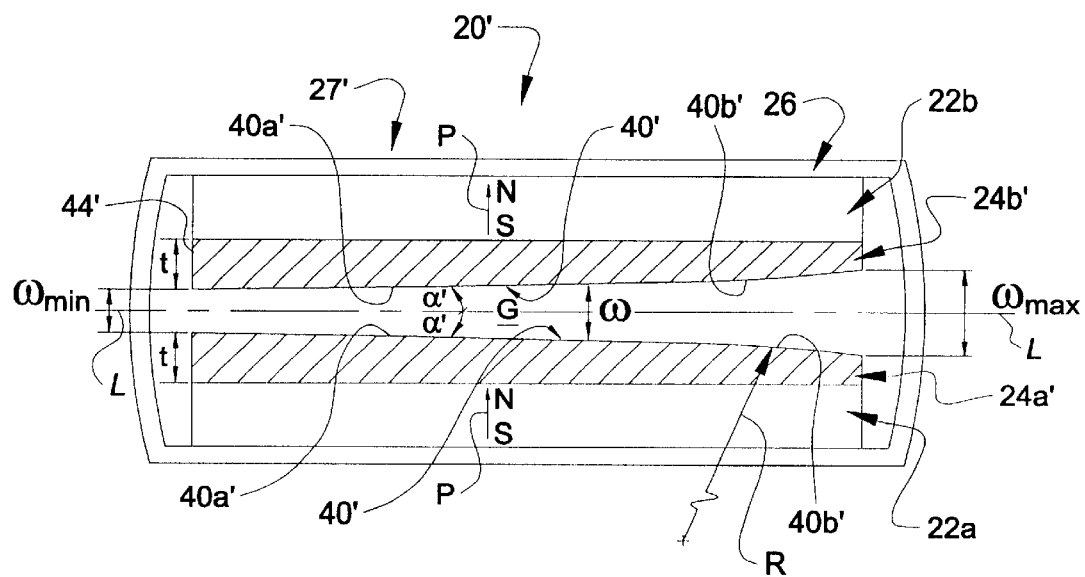
FIG. 15 is a top plan view of a magnetic position sensor according to another form of the present invention.

Referring to FIG. 15, shown therein is a magnetic position sensor 20' according to another embodiment of the present invention. The magnetic position sensor 20' is configured similar to the position sensor 20 illustrated and described above, and functions and operates in a manner similar to that of position sensor 20. The position sensor 20' includes a magnetic circuit that is generally comprised of a pair of magnets 22a, 22b, a pair of shaped pole pieces 24a', 24b', and a magnetically permeable bracket or loop pole piece 26. The magnets 22a, 22b, the shaped pole pieces 24a', 24b', and the loop pole piece 26 cooperate with one another to provide a closed magnetic circuit 27' that generates a magnetic field having a magnetic flux density field strength that varies along an air gap G extending generally along a longitudinal axis L. Although not specifically illustrated in FIG. 15, the magnetic sensor 20' also includes a sensing device that is operable to sense varying magnitudes of the magnetic flux density field generated by the magnetic circuit 27' and to generate an output signal representative of the sensed magnitude of magnetic flux density.

The shaped pole pieces 24a', 24b' preferably have a substantially identical shape and configuration. Each of the shaped pole pieces 24a', 24b' preferably has a varying axial thickness t and includes an inwardly facing tapered surface 40'. Each of the tapered surfaces 40' includes a first tapered portion 40a' and a second tapered portion 40b'. The first and second tapered portions 40a', 40b' of each pole piece are preferably arranged generally opposite one another to define an air gap G therebetween that is preferably substantially symmetrical relative to the longitudinal axis L. The air gap G has a width w that varies along the longitudinal axis L, with the distance between the tapered surfaces 40' adjacent one end of the air gap G defining a minimum gap width $w_{MIN}$, and the distance between the tapered surfaces 40' adjacent the opposite end of the air gap G defining a maximum gap width $w_{MAX}$.

Each of the first tapered portions 40a' preferably defines a planar surface sloped at an acute angle α' relative to the longitudinal axis L. The angle α' preferably falls within a range of about 0.5 degrees to about 20 degrees, and in a more specific embodiment angle α' is approximately 1 degree. However, it should be understood that other acute angles α' are also contemplated as falling within the scope of the present invention, including angles α' less than 0.5 degrees or greater than 20 degrees. Each of the second tapered portions 40b' preferably defines a curved or arcuate surface defining a radius of curvature R. The radius of curvature R preferably falls within a range of about 10 inches to about 40 inches, and in a more specific embodiment the radius of curvature R is approximately 26 inches. However, it should be understood that other radii of curvature R are also contemplated as falling within the scope of the present invention, including radii less that 10 inches or greater than 40 inches.

Although the illustrated embodiments of the present invention depict the use of two or more magnets, it should be understood that in other embodiments of the invention, only one magnet need be used to generate a magnetic field having magnetic flux density that linearly varies along a length of an air gap. Additionally, although the illustrated embodiments of the present invention depict the use of two or more shaped pole pieces, it should be understood that in other embodiments of the invention only one shaped pole piece is used to generate a magnetic field having magnetic flux density that linearly varies along an axis, with the opposing pole piece having a substantially rectangular configuration. However, as would be appreciated by those of skill in the art, such alternative embodiments would likely be more susceptible to output error and/or signal variations caused by lateral or side-to-side movement of the magnetic flux sensor(s) relative to the sensor travel axis.

Moreover, although the illustrated embodiments of the present invention use a single magnetic flux sensor to sense variations in magnetic flux density field strength, it should be understood that a plurality of magnetic flux sensors may be used to generate multiple signal outputs for applications requiring redundant signal outputs and/or multiple signal output profiles. Furthermore, although the magnetic sensors of the present invention are illustrated as being sized to accommodate a specific sensing distance along a travel axis, it should be understood that the magnetic circuit can easily be scaled up or scaled down to accommodate other sensing distances and/or to satisfy the particular operational requirements of the magnetic sensor.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A magnetic sensor, comprising:
   first and second magnets separated by a space;
   first and second shaped pole pieces at least partially disposed within said space and positioned adjacent respective ones of said first and second magnets, said shaped pole pieces being spaced apart to define an air gap having a varying width along a length thereof, said magnets and said shaped pole pieces cooperating to provide a magnetic field having a magnetic flux density that varies along said length of said air gap; and
   a magnetic flux sensor positioned within said magnetic field and operable to sense a varying magnitude of said magnetic flux density along said length of said air gap and to generate an output signal representative of a position of said magnetic flux sensor relative to said magnetic field.

2. The magnetic sensor of claim 1, wherein at least one of said first and second shaped pole pieces defines a tapered surface oriented at an acute angle relative to an axis extending along said length of said air gap, said tapered surface defining at least a portion of said varying width of said air gap.

3. The magnetic sensor of claim 2, wherein at least a portion of said tapered surface is a planar surface.

4. The magnetic sensor of claim 2, wherein at least a portion of said tapered surface is a curved surface.

5. The magnetic sensor of claim 2, wherein each of said first and second shaped pole pieces defines a tapered surface oriented at an acute angle relative to said axis, said tapered surfaces being arranged generally opposite one another and substantially symmetrical relative to said axis to define said varying width of said air gap.

6. The magnetic sensor of claim 1, wherein each of said first and second shaped pole pieces includes a portion of varying thickness extending along said length of said air gap, said portions of varying thickness being arranged generally opposite one another to define said varying width of said air gap.

7. The magnetic sensor of claim 1, wherein said magnetic flux sensor is a magnetoresistive sensor.

8. The magnetic sensor of claim 7, wherein said magnetoresistive sensor includes:
   a first magnetoresistive element positioned within said magnetic field to sense said varying magnitude of said magnetic flux density; and
   a second magnetoresistive element positioned within an auxiliary magnetic field having a substantially uniform magnetic flux density.

9. The magnetic sensor of claim 8, wherein said auxiliary magnetic field is generated by a third magnet positioned adjacent said second magnetoresistive element.

10. The magnetic sensor of claim 8, further comprising an electrical circuit connecting said first and second magnetoresistive elements in series and applying an electric potential across said first and second magnetoresistive elements to generate said output signal at a junction between said first and second magnetoresistive elements.

11. The magnetic sensor of claim 10, wherein said substantially uniform magnetic flux density of said auxiliary magnetic field has a magnitude substantially equal to an average magnitude of said varying magnitude of said magnetic flux density along said length of said air gap.

12. The magnetic sensor of claim 1, wherein each of said first and second magnets has a substantially rectangular configuration.

13. The magnetic sensor of claim 1, wherein each of said first and second magnets are polarized in the same direction.

14. The magnetic sensor of claim 1, further comprising a loop pole piece extending about said first and second magnets and said first and second shaped pole pieces to provide a closed magnetic circuit.

15. A magnetic sensor, comprising:
   first and second magnets separated by a space;
   first and second shaped pole pieces at least partially disposed within said space and positioned adjacent respective ones of said first and second magnets, said shaped pole pieces being spaced apart to define an air gap, at least one of said shaped pole pieces including a portion of varying thickness, said magnets and said shaped pole pieces cooperating to provide a magnetic field having a magnetic flux density that varies along a length of said air gap adjacent said portion of varying thickness; and
   a magnetic flux sensor positioned within said magnetic field and operable to sense a varying magnitude of said magnetic flux density along said length of said air gap and to generate an output signal representative of a position of said magnetic flux sensor relative to said magnetic field.

16. The magnetic sensor of claim 15, wherein each of said first and second shaped pole pieces includes a portion of varying thickness extending along said length of said air gap.

17. The magnetic sensor of claim 16, wherein said portions of varying thickness are arranged generally opposite one another and are symmetrical relative to an axis extending along said length of said air gap.

18. The magnetic sensor of claim 16, wherein said portions of varying thickness cooperate to define a varying width of said air gap along said length.

19. The magnetic sensor of claim 18, wherein each of said first and second shaped pole pieces defines a tapered surface oriented at an acute angle relative to an axis extending along said length of said air gap, said tapered surfaces being arranged generally opposite one another to define said varying width of said air gap.

20. The magnetic sensor of claim 19, wherein at least a portion of each of said tapered surfaces is a planar surface.

21. The magnetic sensor of claim 19, wherein at least a portion of each of said tapered surfaces is a curved surface.

22. The magnetic sensor of claim 15, wherein said magnetic flux sensor is a magnetoresistive sensor.

23. The magnetic sensor of claim 22, wherein said magnetoresistive sensor includes:
 a first magnetoresistive element positioned within said magnetic field to sense said varying magnitudes of said magnetic flux density; and
 a second magnetoresistive element positioned within an auxiliary magnetic field having a substantially uniform magnetic flux density.

24. The magnetic sensor of claim 23, further comprising an electrical circuit connecting said first and second magnetoresistive elements in series and applying an electric potential across said first and second magnetoresistive elements to generate said output signal at a junction between said first and second magnetoresistive elements.

25. A magnetic sensor, comprising:
 at least two magnets;
 at least two shaped pole pieces positioned adjacent respective ones of said magnets, said at least two shaped pole pieces being spaced apart to define a first air gap and a second air gap, said at least two magnets and said at least two shaped pole pieces cooperating to provide a first magnetic field having a magnetic flux density that varies along a length of said first air gap and to provide a second magnetic field having a magnetic flux density that varies along a length of said second air gap; and
 a magnetic flux sensor, including:
  a first magnetic flux sensor element positioned within said first magnetic field and operable to sense a varying magnitude of said magnetic flux density along said length of said first air gap; and
  a second magnetic flux sensor element positioned within said second magnetic field and operable to sense a varying magnitude of said magnetic flux density along said length of said second air gap; and
 wherein said first and second magnetic flux sensor elements cooperate to generate an output signal representative of a position of said magnetic flux sensor relative to said first and second magnetic fields.

26. The magnetic sensor of claim 25, wherein said first and second magnetic flux sensor elements are magnetoresistive elements.

27. The magnetic sensor of claim 26, further comprising an electrical circuit connecting said first and second magnetoresistive elements in series and applying an electric potential across said first and second magnetoresistive elements to generate said output signal at a junction between said first and second magnetoresistive elements.

28. The magnetic sensor of claim 25, wherein said varying magnitude of said magnetic flux density along said length of said first air gap is inversely proportional to said varying magnitude of said magnetic flux density along said length of said second air gap.

29. The magnetic sensor of claim 25, wherein said first air gap has a varying width to provide said varying magnitude of said magnetic flux density along said length of said first air gap, said second air gap having a varying width to provide said varying magnitude of said magnetic flux density along said length of said second air gap.

30. The magnetic sensor of claim 29, wherein said varying width of said first air gap converges, and wherein said varying width of said second air gap diverges.

31. The magnetic sensor of claim 25, wherein said at least two shaped pole pieces include portions of varying thickness to provide said varying magnitude of said magnetic flux density along said length of said first air gap and along said length of said second air gap.

32. The magnetic sensor of claim 25, wherein said first and second air gaps extend along a common longitudinal axis.

33. The magnetic sensor of claim 32, wherein said first and second air gaps are substantially symmetrical relative to a transverse axis arranged substantially perpendicular to said longitudinal axis.

34. The magnetic sensor of claim 25, wherein said first air gap extends along a first axis, said second air gap extending along a second axis offset from said first axis.

35. The magnetic sensor of claim 34, wherein said first axis and said second axis are substantially parallel.

36. A magnetic sensor, comprising:
 first and second magnets;
 first and second shaped pole pieces positioned adjacent respective ones of said first and second magnets and spaced apart to define an air gap, said magnets and said shaped pole pieces cooperating to provide a magnetic field having a magnetic flux density that varies along a length of said air gap; and
 a first magnetoresistive element positioned within said magnetic field to sense a varying magnitude of said magnetic flux density along said length of said air gap; and
 a second magnetoresistive element positioned within an auxiliary magnetic field having a substantially uniform magnetic flux density; and
 wherein said first and second magnetoresistive elements cooperate to generate an output signal representative of a position of said first magnetoresistive element relative to said magnetic field.

37. The magnetic sensor of claim 36, wherein said auxiliary magnetic field is generated by a third magnet positioned adjacent said second magnetoresistive element.

38. The magnetic sensor of claim 36, further comprising an electrical circuit connecting said first and second magnetoresistive elements in series and applying an electric potential across said first and second magnetoresistive elements to generate said output signal at a junction between said first and second magnetoresistive elements.

39. The magnetic sensor of claim 36, wherein said substantially uniform magnetic flux density of said auxiliary magnetic field has a magnitude substantially equal to an average magnitude of said varying magnitude of said magnetic flux density along said length of said air gap.

40. The magnetic sensor of claim 36, wherein said second magnetoresistive element is operable to generate an electronic signal representative of an ambient temperature adjacent the magnetic sensor.

* * * * *